Figure 1:
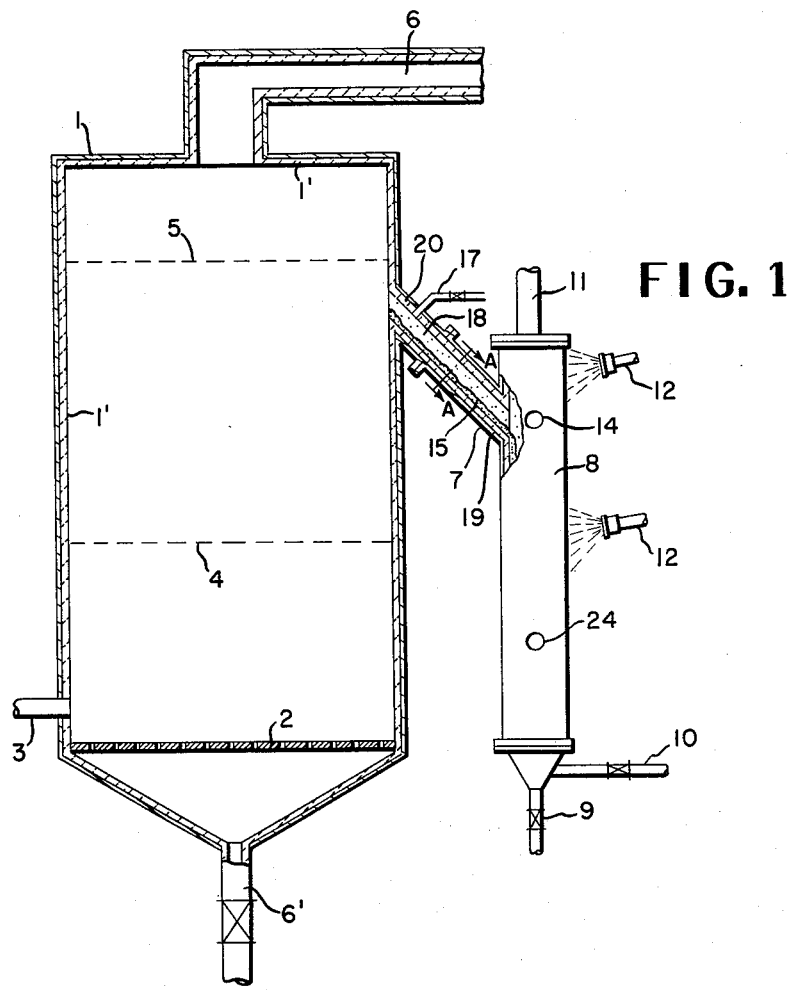

Aug. 11, 1964     A. P. ENGELMANN     3,144,303
FLUIDIZATION PROCESS
Filed Aug. 30, 1960

INVENTOR
ALFRED P. ENGELMANN
BY John P. Hancock
ATTORNEY

United States Patent Office 3,144,303
Patented Aug. 11, 1964

3,144,303
FLUIDIZATION PROCESS
Alfred P. Engelmann, Taylors, S.C., assignor to E. I. du Pont de Nemours and Company, Wilmington, Del., a corporation of Delaware
Filed Aug. 30, 1960, Ser. No. 52,840
11 Claims. (Cl. 23—87)

This invention relates to the reaction of granular or particulate solids while in suspended or fluidized state, and more particularly, to novel methods for reacting such solids continuously while the composition and/or temperature of the fluidized bed is maintained within desired, controlled limits.

More specifically, the invention relates to a continuous method for the production of volatile metal halides, especially those of titanium tetrachloride and ferric chloride, by reacting within a closed reaction vessel at elevated temperatures and in the presence of a gaseous or finely divided, solid reducing agent, chlorine and a fluidized bed suspension of a finely divided titaniferous material, such as ilmenite or rutile, while the temperature and composition of the bed is being maintained within optimum operating condition by means of a dynamic interchange between a portion of the particles of the reactant bed with particles from a communicating separate, auxiliary fluidized bed maintained under controlled or regulated non-reacting conditions.

In U.S. Patent 2,701,179, highly useful methods are disclosed for producing titanium and iron chlorides by chlorinating a titaniferous material while in fluidized state. A highly exothermic reaction is involved in the process in which temperatures of the order of from about 600–1100° C., and preferably from about 850–950° C. prevail and the chlorinating gas reactant is charged upwardly through the reactor at such velocity that the solids reactant is maintained in the form of a bubbling bed suspension. A vertical-type reaction vessel having suitable inlets and outlets and internally lined with a protective, corrosion-resistant refractory material is employed in the process. To obtain a continuous, steady type of operation with control over the excess heat generated in the reaction, many auxiliary expedients are resorted to. Thus, to avoid such bed overheating and ensuing, undesired reactor and equipment corrosion as well as sintering of the reaction mass, blockage or partial stoppage of the system and an inefficient, uneconomical type of operation, a portion of the bed particles is removed, subjected to cooling and is recycled back to the system. Disadvantageously, the chlorinating operation must be temporarily interrupted when this is undertaken. Recombining the cooled product with the reactant gases before re-entering the reactor proves to be uneconomically attractive because high circulation loads are required and many operating difficulties are encountered due to the corrosive nature and heterogeneous mixture of the composition being handled. Alternatively, the reactor can be cooled externally by coolant spraying. This proves inadequate with large-size reactor equipment having relatively thick, internally lined walls. Various expedients such as valved standpipes, side withdrawal legs and U-tubes are also resorted to, but these present difficulties too, due to the prevailing high temperatures and corrosive reactant gases employed in these operations.

It is among the objects of this invention to overcome the foregoing and other disadvantages which have characterized prior techniques for effecting fluidized bed reaction techniques, and to provide novel and effective methods and means for attaining such objects. Among the particular objects of the invention are: to provide a novel method for regulating and controlling the physical and chemical characteristics as well as the reactant conditions of an expanded, fluidized reaction bed adapted to be continuously reacted within a closed reactor, and particularly in systems characterized by the presence of highly corrosive reactants and in which relatively high reaction temperatures exist; to provide novel methods for controlling a fluidized bed reaction by readily and effectively regulating the amount of heat to be removed therefrom or added thereto, and to attain such object economically and without causing any interruption to occur in the fluidized reaction being undertaken; to provide novel methods for controlling and maintaining constant, as desired, the composition and temperature of a fluidized reaction bed employed in the chlorination of a titaniferous material, and particularly through the automatic removal of solid bed titanium bed particles from or the addition of particulate solid titanium particles to an expanded fluidized bed within a chlorination reactor without encountering any interruption in the reaction or operation of the reactor; to provide in operative association with an expanded fluidized reaction bed a separate, auxiliary fluidized bed maintained under non-reactive conditions adapted through interchange of its suspended particles with those of the reacting bed to regulate and control the chemical composition and temperature of the fluidized reaction bed within desired, optimum limits; to provide a novel method for desirably chemically conditioning the reaction bed particles prior to their removal from the system; and to provide through various combinations of the controls adapted to be employed herein effective means for maintaining the operation of the fluidized bed reactor within desired, optimum limits. Other objects and advantages of the invention will be apparent from the ensuing description and accompanying drawings in which—

Figure 2:
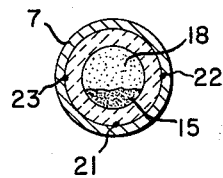

FIG. 1 is a diagrammatic, side elevational view, partly in section, of one form of apparatus for carrying out the invention; and FIG. 2 is a cross-sectional view, taken on a line A—A of FIG. 1.

These and other objects are attainable in this invention which comprises providing and maintaining a two-directional dynamic interchange between the particles of a separate fluidized reaction bed and a separate fluidized auxiliary bed which is maintained under conditions dissimilar to those which prevail in said reaction bed, and effecting said interchange by passing said particles through a relatively restricted communicating conduit interposed between said reaction and auxiliary beds and through which the particles from said reaction bed pass downwardly by gravity flow into said auxiliary bed while the particles from said auxiliary bed pass upwardly by gas-conveyed flow into said reaction bed.

In a more specific embodiment, the invention comprises adjusting the solids and heat content of a continuously expanded fluidized chlorination reaction bed by establishing and maintaining a dynamic two-directional flow and interchange between fluidized bed particles of substantially the same chemical composition maintained in a separate, continuously operating reaction bed and under an elevated temperature wherein fluidization of said particles is being effected by means of a chlorinating reactant gas, and a separate, auxiliary bed, the particles of which are being fluidized by means of an inert gas, effecting said interchange through a restricted communicating passage interposed between said reaction and auxiliary beds and in and through which the particles from the reaction bed flow downwardly by gravity into the auxiliary bed and the particles from said auxiliary bed simultaneously pass upwardly in gas-conveyed flow into said reaction bed, and continuing said interchange of particles until desired adjustment is reached of the temperature, bed composition or operating conditions of said reaction bed.

In procuring the desired controls over the operating conditions of a reaction bed through the dynamic interchange of fluidized bed particles contemplated in this invention, and particularly where an inert fluidizing gas is utilized in the auxiliary bed, one can conveniently—

(a) Control and regulate within optimum and desired limits the temperature conditions prevailing in the fluidized reaction bed by maintaining a substantially equal rate of particles exchange between the reaction and auxiliary beds. This is readily attained by (1) subtracting through cooling treatment within the auxiliary vessel sufficient heat from the particles introduced or passed into the auxiliary bed and which will provide the desired lowering of the temperature of the reaction bed on their return from said auxiliary bed to said reaction bed; or (2) adding sufficient heat to the withdrawn or other particles within the auxiliary bed as will increase the temperature of the reaction bed to the degree desired on passage of the heated particles from the auxiliary bed into the reactor bed;

(b) Control over the reaction bed weight by providing and maintaining the exchange of particles between the reaction and auxiliary beds at substantially unequal rates by (1) returning fewer particles from the auxiliary bed to the reaction bed than is received by the auxiliary bed and independently discharging such particles from the auxiliary bed and the system to decrease the weight of the reaction bed, or (2) returning to the reaction bed a larger amount of particles than the auxiliary bed receives therefrom and feeding new or additional bed particles independently to the auxiliary bed for passage to the reaction bed to increase, as desired, the latter's bed weight.

Referring to the drawings, an enlarged conical-bottomed vertical reactor 1 is shown consisting of a corrosion-resistant steel or other desired metal or alloy vessel which is lined internally with fire brick or other protective refractory material 1' adapted to withstand chlorine or other attack during a chlorination operation. Operatively positioned in the base portion of the reactor 1 is a perforated or orificed distributing plate assembly 2 for supporting, in either static or fluidized state, a bed of solid reactant particles such as a solids mixture of finely divided titaniferous ore and a carbonaceous reducing agent, such as carbon, coal, coke, etc. An inlet 3 is provided in the reactor immediately above the plate assembly 2 through which the solids reactant mixture can be continuously or intermittently charged by means of a screw conveyer, injection pump, or other device (not shown) into the reactor from said inlet wherein fluidization and reaction thereof with a halogen-containing gas, especially chlorine, is brought about, such reaction being conducted at temperatures ranging from an excess of about 600° C. to about 1100° C., and preferably at from 850° C. to 1000° C. A valve-controlled inlet 6' is provided in the bottom portion of the reactor 1 through which the chlorine or other gaseous halogen reactant can be fed for passage upwardly through the distributer plate and the reactor with the solids particles being converted from static condition with a bed level 4 to an expanded bubbling bed suspension having a bed level 5. An outlet 6 is provided in the upper portion of the reactor 1 through which volatile products of reaction formed in the reactor are continuously withdrawn for passage to conventional recovery equipment (not shown) to effect condensation, separation and recovery of the chlorination or halogenation products.

Operatively associated with reactor 1 and adapted to be maintained in direct, and if desired, open communication with the interior of the reactor 1 at a point just below or coinciding with its expanded bed level 5 through a downwardly inclined passageway or conduit 7, is a separate, auxiliary fluidizing vessel 8. The communicating conduit 7 is preferably inclined at an angle of 60° to the horizontal and is provided with a valve-controlled purge line inlet 17 in its upper portion by means of which an inert shielding gas, such as carbon dioxide, nitrogen, argon, helium or recycled uncondensable gas from the $TiCl_4$-producing system can be charged into the passage of the conduit 7 to prevent reaction gas from entering the chlorination reactor 1 or to prevent reaction gas from entering the auxiliary vessel 8 from the chlorination reactor 1. The conduit 7 and auxiliary vessel 8 can be lined internally with fire brick or other protective refractory material and the vessel 8 is provided with a valve-controlled solids outlet 9, an inert fluidizing gas inlet 10 and a solids inlet 11. Spray elements 12 are suitably associated with the auxiliary vessel 8 whereby external cooling of said vessel and its contents can be effected through the application of water or other desired liquid coolant.

In operating an apparatus such as that described to produce titanium tetrachloride and ferric chloride in accordance with one preferred adaptation of the invention by reaction of a titaniferous ore with chlorine, the reactor is initially preheated to the desired operating temperature by burning a suitable fuel therein or reacting an oxygen-containing gas with coke or by introducing hot products of combustion from an oil burner or other source of heat supply. A finely ground (capable of passing a 50 mesh screen) mixture comprising about 1 part of powdered coke and about 5 parts of powdered ilmenite is fed into the reactor 1 via its inlet 3 and to form therein a static bed of such material with a level 4. At the same time, a mixture of the same composition is introduced into the unheated auxiliary vessel 8 via its inlet 11 and to fill the vessel with such mixture. Upon completion of the solids introduction into the reactor and auxiliary vessel, an inward flow of purge gas through the line 17 of the inclined conduit 7 is maintained and a chlorine-containing gas is then charged continuously via inlet 6' into the bottom of the reactor 1 and at a rate sufficient to fluidize the static bed particles present and form a bubbling bed reaction bed suspension. The velocity of the gaseous halogenating material so introduced is not less than, say, about 40 feet per second and is of such order that upon its introduction into and expansion within the reactor is an upward gas flow of about .1–10 feet per second and preferably .2–2 feet per second will be provided, employing solids of the particle size indicated. Volatilized products of reaction ($TiCl_4$- and $FeCl_3$-containing gases) formed in the ensuing reaction are removed from the reactor through its outlet 6 to pass to cyclone, condensing and separating equipment for ultimate recovery.

When, for example, the temperature prevailing in the reaction bed of the reactor 1 exceeds the above indicated ranges, and adjustment and regulation of such temperature is desired in accordance with the invention, purge gas introduction into the inclined conduit 7 from the line 17 is interrupted and fluidization of the static bed particles in the unheated auxiliary vessel 8 is undertaken by passing an inert fluidizing gas through such particles via the inlet 10 of said vessel. In consequence, the above described dual interchange of particles between the fluidized reaction and auxiliary beds takes place with a portion of the bed particles from the reactor being transferred via communicating passage 7 into the cooled auxiliary vessel 8 for cooling and return to the chlorination bed reactor along with fluidized auxiliary bed particles to thereby reduce the temperature of the chlorination bed to the desired level while maintaining the other operating conditions of the chlorination reactor relatively constant. When the desired temperature adjustment of the reaction bed has been accomplished, the fluidization of particles in the auxiliary vessel is interrupted, introduction of the purge gas into the conduit 7 is recommenced and the auxiliary vessel is allowed to again become filled with bed particles which remain in static, non-fluidized condition with little or no in-flow of fluidizing gas until further temperature adjustment of the chlorination bed is required. In the same manner, periodic adjustment and control over the composition and bed weight of the particles in the reaction bed can be effected, with fresh particles being charged to the auxiliary vessel via its inlet 11.

Recourse to relatively inert or non-corrosive fluidizing gases in the auxiliary vessel 8 proves particularly advantageous when the gas phase of the reactor 1 is of a corrosive nature and when the reaction being undertaken takes place at relatively high temperatures. The corrosive gas phase of the main reactor is excluded from the auxiliary bed and the constricted inclined passage 7 connecting the two beds and by flow of a non-corrosive gas employed to fluidize the particles in the auxiliary vessel. This is accomplished by maintaining the static pressure in the auxiliary bed at least slightly higher than that prevailing in the main fluidized reaction bed and a high, superficial, upward gas velocity within the inclined passage so that the auxiliary bed will be maintained in a fluidized condition and the desired percentage of bed particles will be gas conveyed upwardly through the upper portion of the passageway of the conduit 7 while concurrently, a sliding down-flow is effected of bed particles from the reaction bed and in the lower or bottom portion of the passageway of said conduit. By thus excluding a corrosive gas phase from the auxiliary bed, effective cooling and heating can be more readily and economically accomplished in the auxiliary bed than would be afforded by direct methods because high heat conductivity materials can be used as materials of construction in place of refractory or ceramic type materials required in the chemical reaction bed and without attendant corrosion problems being encountered. In addition, feeding reactant solids directly to, or removing bed particles directly from the auxiliary bed can be accomplished more simply and less expensively than by adding or removing solids directly to or from the reaction bed. This is particularly true because the auxiliary bed can operate at lower temperatures than the reaction bed and the corrosive reaction gases are eliminated from the immediate point of in-put or outlet.

To a clearer understanding of the invention, the following specific examples are given which are to be considered as being merely illustrative and not in limitation of the invention.

EXAMPLE I

Employing an apparatus of the type shown in FIG. 1, a finely divided (10–50 mesh size) mixture of ilmenite and carbon was reacted in fluidized state at 850–950° C. with chlorine following its introduction into the preheated reactor 1 and while the temperature of said reactor was maintained substantially within said range by intermittently exchanging, when the temperature varied outside such range, solid particles of the actively fluidized chlorination bed with similar particles from the fluidized bed of an auxiliary vessel in which the particles were fluidized with carbon dioxide. In the operation, a portion of the bed particles from the reactor were transferred via a communicating passage disposed therebetween and inclined at a 60° angle from the horizontal from the auxiliary vessel which was cooled by heat conduction through its shell. The cooled particles were returned to the chlorination reactor to reduce the temperature of the chlorination bed to the desired level while the other operating conditions of the chlorination reactor were maintained relatively constant. Upon completing the desired temperature adjustment, fluidization of the particles in the auxiliary vessel was interrupted and said vessel was again filled with bed particles which remained in static, non-fluidized condition with little or no inflow of carbon dioxide until further temperature adjustment of the chlorination bed was required. During periods of non-fluidization in the auxiliary vessel, an inward flow of carbon dioxide through the purge line 17 in the inclined conduit 7 was maintained in order to prevent chlorination reactor gas from entering the auxiliary vessel. A composite sample of the bed particles removed from the chlorination bed during the operation possessed the following composition:

|  | Percent |
|---|---|
| Carbon | 17 |
| $TiO_2$ | 61 |
| Other | 22 |
|  | 100 |

The sieve analysis of the bed material was as follows:

| | |
|---|---|
| +8 mesh | 5.6 |
| −8+12 mesh | 6.3 |
| −12+20 mesh | 6.3 |
| −20+30 mesh | 3.9 |
| −30+60 mesh | 18.7 |
| −60+100 mesh | 28.8 |
| −100+140 mesh | 18.8 |
| −140+200 mesh | 9.0 |
| −200+325 mesh | 1.9 |
| −325 mesh | .3 |
| | 99.6 |

In the operation, chlorine was admitted into the bottom of the reactor through the plate assembly 2 for uniformly distributing the gas and passed upwardly into the reactor and the mixture of ilmenite ore and carbon, was continuously fed through the inlet 3. The reaction products comprising $TiCl_4$ and $FeCl_3$ were continuously removed in the vapor state through the outlet 6 and condensed and separated in associated equipment. The chlorine gas velocity in the reaction bed was maintained sufficiently high to expand the bed volume approximately two times that of the static volume of the bed and to maintain the bed level slightly above the reactor opening leading into the inclined passage 7 and independently fluidized auxiliary vessel 8. $CO_2$ gas was introduced as the fluidizing medium into the bottom of said auxiliary vessel and through the conduit 10, and the static pressure in the auxiliary unit was maintained during the interchange slightly in excess of that prevailing in the reactor 1. The steel shell of the vessel 8 was entirely cooled exteriorly and by flowing water thereover from the sprays 12.

After establishment of a dynamic interchange, solid particles 15 from the chlorination reactor overflowed downwardly over the bottom, lower portion of the inclined passageway 7 and countercurrent to the flow of $CO_2$ gas-suspended particles flowing upwardly as shown at 18 from the auxiliary vessel in the upper portion of the passage 7 and into the chlorination reactor 1. Recording thermocouples were maintained on the bottom portion 19 and upper portion 20 of the passage 7, and the temperature recordings shown in Table I below disclose the temperatures of the bed particles passing downwardly along the inclined passage at the point 21 leading into the auxiliary vessel 8. The averaged temperatures, read at the points 22 and 23, represent the temperature of the $CO_2$ gas and particles flowing upwardly into the chlorination reactor. The data shown in Table I establishes that upon fluidization of the auxiliary bed with $CO_2$, the amount of bed material interchanged in the inclined conduit 7 connecting the upper levels of the fluidized reaction and auxiliary beds, increased as the rate of $CO_2$ introduced into the auxiliary bed was increased over the range indicated. The partial cooling effected in the auxiliary vessel 8 was shown by thermocouple temperature readings taken at the point near the bottom of the bed and at the point 14, near the top of said bed. This cooling effect is shown further by the difference in temperatures existing in the solids being passed in dual exchange through the conduit 7. The particles entering from the chlorination reactor were about 100° C. higher than the reading obtained in the upper part of the conduit 7 where the bed particles were being conveyed upwardly, from the auxiliary unit and back to the chlorination furnace. From heat balance data around the auxiliary unit, the total volume of bed material being interchanged was calculated. Superficial gas velocity within the auxiliary bed was calculated, using the temperature at the point 14 in the top of the auxiliary bed. In the inclined annular conduit 7, the average at the points 21 and 22 was used. As a net result, cooling of the fluidized chlorination bed was obtained, as shown in the last column of Table I. After desired reduction in temperature had been effected, the flow of fluidizing gas to the auxiliary vessel 8 was discontinued, and that vessel was again filled with bed solids. It remained in standby condition until its further use was required and while the operation of the chlorination reactor was continued.

The dynamic interchange of particles which is effected within an inclined, connecting passageway between fluidized reactor bed particles and an auxiliary fluidized bed can be shown by operation of a transparent form of apparatus and the unexpected interchange flow patterns and conditions under which they occur can be readily and visionally demonstrated by such apparatus. Thus, utilizing an apparatus such as shown in the drawings with the length of the auxiliary vessel being approximately one-third and the diameters of that vessel and the communicating passage (inclined at an angle of 60° to the horizontal) being one-half of those shown in the drawings, the superficial gas velocity ratio in the auxiliary bed to that in the communicating passage is substantially the same in both devices. Thus, the transparent fluidized bed reactor can be 12" in diameter and 8' in height; the reactor can be provided with a porous plate to retain bed particles and distribute air employed as the fluidizing gas and which can enter at a suitable intake and be metered

*Table I*

| Time in hours after startup of aux. bed as cooling unit | Aux. bed unit fluidizing s.c.f.m. of $CO_2$ | Superficial vel., ft./sec. in 10" section of aux. bed | Superficial Vel. (upward) in 4" inclined sec., ft./sec. | Temp., °C., lower portion of aux. bed at (24) | Temp., °C., upper portion aux. bed at (14) | Temp., °C., solids downflow in incline at (21) | Temp., °C., solids and gas upflow in incline at (22) and (23) | Total heat to water m.p.c.u./hr. | Est. cu. ft./ hr.=bed material interchanged | Bed. temp., °C., chlorination furnace |
|---|---|---|---|---|---|---|---|---|---|---|
| Start | 16 | 90 | 9.8 | 350 | 535 | 900 | 815 | 481 | 73 | 1,060 |
| ½ | 23 | 1.46 | 12.8 | 530 | 720 | 920 | 825 | 689 | 108 | 1,060 |
| 1 | 23 | 1.50 | 8.65 | 590 | 700 | 950 | 845 | 754 | 140 | 1,050 |
| 1½ | 23 | 1.46 | 8.85 | 530 | 680 | 920 | 835 | 758 | 135 | 1,045 |
| 2 | 35 | 2.45 | 7.9 | 680 | 790 | 930 | 815 | 872 | 141 | 1,040 |
| 2½ | 35 | 2.47 | 7.95 | 690 | 800 | 940 | 835 | 857 | 153 | 1,040 |
| 3 | 28 | 1.80 | 8 | 580 | 720 | 920 | 810 | 785 | 129 | 1,035 |
| 3½ | 28 | 1.96 | 8 | 680 | 720 | 930 | 825 | 817 | 141 | 1,035 |
| 4 | 28 | 1.80 | 8.65 | 560 | 705 | 910 | 722 | 761 | 131 | 1,035 |
| 4½ | 18 | 1.04 | 9.6 | 400 | 550 | 910 | 825 | 572 | 99 | 1,035 |
| 5 | 18 | 1.10 | 9.4 | 435 | 550 | 890 | 860 | 567 | 121 | 1,035 |

Static pressure in auxiliary fluidized bed—7 p.s.i.g.
Static pressure in chlorination furnace—4–5 p.s.i.g.

EXAMPLE II

In another run, carried out in the same apparatus and using the same conditions and chemical system employed in Example I, the effectiveness of the dynamic dual interchange in the inclined annular conduit 7 as a means of controlling through reduction the amount of bed material employed in the chlorination reactor, the auxiliary bed vessel was operated as a discharge unit to remove bed solids from the system. By adjusting the fluidization flow rate whereby the amount of solids material downflowing from the reaction bed into the auxiliary unit is in excess of that upflowing and returning to said bed, and by intermittently withdrawing solids particles from the bottom of the auxiliary unit through outlet 9 free of fuming due to chlorine and $TiCl_4$ when discharged at a temperature range of 415–520° C. to the atmosphere, reduction is brought about of the total bed weight in the chlorination reactor and while other operating conditions were maintained substantially constant.

The data in Table II below demonstrates the effectiveness which such dual exchange of solids provides:

in a rotameter, the flow rate being controlled by suitable valved means. The reactor can be filled with finely divided solid particles to a level about 6" below its inclined conduit outlet and upon introducing unheated compressed air to a valve-controlled rotameter into the conical bottom of the reactor for passage through the bed at about 9.95 foot per second, the bed expanded to a higher level, about 6" above such outlet. Air escaped from the reactor through suitable vent means. The inclined, annular communicating passage between the reactor and auxiliary vessels was also composed of transparent material as was the auxiliary vessel itself. The internal diameter of the auxiliary vessel was 4½" and the internal diameter of the inclined passage was 1¾". The top of the auxiliary vessel was closed with a transparent cap and a valve-controlled standpipe for solids removal extended into the lower space of the reactor.

In operating this transparent type of apparatus, unheated air was used as the fluidizing gas in both the main reaction bed and in the auxiliary vessel. Solid particles fluidized and exchanged can consist of the dry

*Table II*

| Time in hours after startup of aux. fluid bed | Aux. bed unit fluidizing, s.c.f.m. of $CO_2$ | Aux. bed, 10" sec. superficial vel., ft./sec. | Inclined (4" sect.) superficial vel. upward, ft./sec. | Temp., °C., lower portion of aux. bed at (24) | Temp., °C., upper portion of aux. bed at (14) | Temp., °C., solids downflow-inclined sect. at (21) | Temp., °C., solids and gas upflow in inclined sect. at (22 and 23) | Total heat to water, m.p.c.u./ hr. | Est. cu. ft./hr., bed material interchanged | Bed material discharged from aux., pounds | Bed temp., °C., chlorination furnace |
|---|---|---|---|---|---|---|---|---|---|---|---|
| Start | 17 | .95 | 8.6 | 415 | 550 | 910 | 737 | 550 | 49 | | 1,060 |
| ½ | 17 | .97 | 9.2 | 420 | 550 | 870 | 776 | 550 | 53 | 875 | 1,060 |
| 1 | 17 | 1.07 | 9.4 | 430 | 587 | 897 | 815 | 550 | 60 | 875 | 1,060 |
| 1½ | 17 | 1.10 | 9.5 | 520 | 650 | 943 | 836 | 660 | 68 | 875 | 1,060 |
| 2 | 17 | .96 | 8.8 | 430 | 590 | 870 | 755 | 635 | 52 | 875 | 1,060 |
| 2½ | 17 | 1.07 | 9.7 | 475 | 610 | 950 | 850 | 635 | 86 | 875 | 1,060 |
| 2¾ | 17 | 1.08 | 9.1 | 520 | 640 | 870 | 785 | 675 | 73 | 600 | 1,060 |

Static pressure—chlorination reactor—7 p.s.i.g.
Static pressure—auxiliary bed—4 p.s.i.g.
Density bed material discharged—100 pounds/cu.ft.

bed particles removed from a fluidized chlorination furnace such as employed in the titanium ore chlorination described in the examples. From this operation, it was found that between 0.8 and 1.2 feet per second (superficial velocity of air) in the auxiliary vessel resulted in some dual interchange of particles within the inclined connecting passage and that when air velocity of from 2.6–3.3 feet per second was employed, the interchange was most complete and effective. Above 3.3 feet per second, the interchange dropped off rapidly. Hence, with the equipment described, the most effective dual interchange occurred when the superficial gas velocity in the inclined communicating conduit ranged from 5–10 times that maintained in the auxiliary vessel.

While particular reactants, proportions, temperatures, rates, etc., are mentioned as utilizable, the invention is not restricted thereto. Thus, in addition to ilmenite use, other titaniferous materials, such as rutile or various titanium dioxide concentrates, can be employed, provided when used, they are in finely divided or powdered form, preferably, finer than 100 mesh. Also, while a solid type of reducing agent, especially free carbon or coke, is preferred for employment, gaseous reducing agents which are non-reactive toward the chlorinating or halogenating agent, such as carbon monoxide, can be resorted to. The preferred 1:5 ratio of reducing agent to titaniferous material mentioned also can be varied and to include ratios ranging from 1:2 to 1:6, or higher. Again, while separate introduction has been effected of a mixture of ore-reducing agent reactants and the halogenating agent in the description and drawings, it will be obvious that this mixture can be fed into the reactor while entrained or suspended in the chlorinating agent, as contemplated in U.S. Patent 2,701,179. It is to be further understood that though particularly applicable to a chlorination process for recovering volatile metal chlorides, especially of titanium, the invention can be adapted to other systems wherein treatment of solids while maintained in gaseous fluidized suspension is being undertaken. Thus, it can be generally used for obtaining an accurate control of the temperature of suspended solids, whether maintained in fluidized state for the purpose of effecting a chemical reaction between solids and a gas or gases, or for effecting an exchange of heat between solids, or for maintaining and controlling the composition or bed weight of the fluidized solids under treatment or reaction. Examples of such additional applications include systems for heating and/or separating suspended catalyst particles from gases, methods for catalytically converting hydrocarbon oils with suspended catalytic materials, oxidation systems, particularly when effected with air at relatively high temperature; reduction of hematite to magnetite; roasting of arseno-pyrites and sulfides of zinc, copper and iron; sulphatization processes such as the conversion of copper oxide to copper sulphate; and to heat transfer operations wherein sensible heat is transferred from solid to gas phase or the reverse.

As already noted, the use of an inert, non-corrosive gas as the fluidizing medium in the auxiliary vessel 8 is highly advantageous. Such gas protects the auxiliary fluidized bed equipment by excluding chlorine or other corrosive chemical reactor bed gases from the auxiliary vessel. This is due to the fact that a relatively high velocity flow of non-corrosive gas and bed particles through the inclined annular passage 7 into the reactor 1 is induced and a static pressure higher than that existing in said reactor is provided for. The non-corrosive gas used is selected in accordance with the type of reaction being undertaken. In particular, a gas which permits use of an auxiliary unit fabricated from ordinary materials of construction, such as steel, is advantageously useful. In the instance of a titanium ore chlorination operation, recourse to carbon dioxide, carbon monoxide or nitrogen will prove to be particularly useful.

The employment of a gaseous material having a particular conditioning effect upon the bed particles may prove desirable. For example, an oxidizing gas such as oxygen may be useful under some circumstances. Under other conditions, as for example in the removal of niobium metal particles from a furnace in which niobium chloride is being reduced by hydrogen to the metal, hydrogen may be the preferred fluidizing gas for the auxiliary bed. This is particularly true because in the presence of the hydrogen at relatively low temperatures, hydrides of niobium metal are formed, rendering the particles friable and therefore easily comminuted, and undesired oxidation of the product is avoided.

The invention is also advantageously useful in the removal of silicon particles from a fluidized bed unit wherein particulate silicon is produced by decomposition of monosilane, product removal, or bed cooling, using hydrogen as the fluidizing gas in the auxiliary bed. In this manner, undesired air inleakage and consequent contamination of the product is avoided, and many solids handling problems are simplified.

The control of the process to establish and maintain a dual exchange of particles within the inclined conduit 7 can be established for any given configuration experimentally. The size of the constricted annular inclined passage 7 is such that the upward superficial velocities in passage is of the order of 5 to 10 times that in the bed of the auxiliary vessel 8 for most effective dual interchange operation of the apparatus and system described. Since the range will vary with larger or smaller diameter auxiliary vessels or inclined passages, this relationship should be considered only as a guide, and not as a limiting factor.

As above noted, the inclined conduit 7 between the reaction and auxiliary beds is at an angle to the horizontal greater than the angle of repose of the fluidized reactor bed particles so that an easy, sliding gravity downflow will result and be maintained in the lower part of the passage while a high velocity upflow of non-corrosive gas-suspended bed particles from the auxiliary vessel will take place in its upper or top passageway portion. For the particles being removed from an ilmenite chlorination bed, such as shown in the examples, the angle of repose ranges from 38–45°. Hence, to provide for ready and easy sliding and movement down the conduit passage, such passage is maintained at a greater or steeper angle, e.g., of from 50–70° from the horizontal.

In an operating fluidized bed within a reactor, the actual upper level of the expanded bed can be measured only approximately. This is due to the ebullient nature of the bed itself, and because of the difficulty of making accurate measurements particularly through refractory walls and not corrosive gases. Operation of the reactor is controlled, preferably so that the uppermost level of the expanded bed is maintained above the opening into the inclined passage connecting with the auxiliary bed. Thus, the particles exchanged are preferably received into the exchange conduit from near the top of the expanded reactor bed, and of necessity from near the top of the auxiliary bed.

The dual interchange of solids between two fluidized beds of this invention can be employed to feed one or more components of the bed solids to the main fluidized reaction bed. This can be accomplished by feeding solids to the auxiliary, fluidized bed through valved inlet 11 with the rate of feeding and flow of fluidizing gas to the auxiliary bed being so regulated that the upward flow of solids and inert gas through the passage 7 is greater than the sliding downflow of solids therein to thus provide a net increase in the solid bed particles entering the reactor 1. Furthermore, by heating the exterior shell of the auxiliary vessel 8, the particles being returned to the reactor 1 as well as the feed particles can be preheated to any desired temperature so that heat can be added to the bed undergoing reaction in reactor 1.

I claim:

1. A process for adjusting and controlling the solids and heat contents of an expanded fluidized reacting bed which comprises periodically establishing and maintaining a two-directional flow and interchange of reactant-gas fluidized solid bed particles from said reacting bed with inert-gas suspended particles of the same chemical composition from a separately maintained auxiliary fluidized non-reacting bed, effecting said interchange through an inclined restricted communicating passage maintained between the upper portion of each of said fluidized beds, during said interchange maintaining a higher static pressure by means of said inert gas in said auxiliary bed over that prevailing in said reacting bed and the level of the expanded reacting bed above an inlet into said communicating passage, overflowing suspended reacting bed particles from said reacting bed into said passage for flow downwardly therethrough by gravity along the bottom portion of said passage and into said auxiliary bed, concurrently therewith flowing inert-gas-suspended particles from said auxiliary bed upwardly through the upper portion of said passage and into said reacting bed by maintaining a high upward superficial inert gas velocity in said passage ranging from 5–10 times the gas velocity maintained in said auxiliary bed, and continuing said particle interchange between said auxilary and reacting beds until the desired adjustment being made in said reacting bed becomes effected.

2. A process for adjusting and controlling the solids and heat contents of a continuously expanded reacting bed in which the particles are fluidized by means of a reactant gas, comprising periodically establishing and maintaining a two-directional flow and interchange of reactant-gas fluidized solid bed particles from said reacting bed with inert-gas-suspended particles of the same chemical composition from a separately maintained, unheated fluidized auxiliary bed, effecting said interchange through the medium of an inclined restricted communicating passage maintained between the upper portions of said beds, during said interchange maintaining a higher static pressure by means of said inert gas in said auxiliary bed than that prevailing in said reacting bed and the level of the expanded reacting bed above an inlet into said communicating passage, overflowing suspended reactant particles from said reacting bed into said passage for downward gravity flow therethrough along its bottom portion and into said auxiliary bed, concurrently therewith flowing inert-gas-suspended particles from said auxiliary bed upwardly through the upper portion of said passage and into said reacting bed by maintaining a high, upward superficial inert gas velocity in said passage ranging from 5–10 times the gas velocity maintained in said auxiliary bed, and continuing said interchange of solid bed particles between said reacting and auxiliary beds to meet the adjustment desired in said reacting bed.

3. A process for adjusting and controlling the solids and heat contents of a continuously expanded reacting bed maintained in fluidized state by means of a reactant gas, comprising periodically establishing and maintaining a two-directional simultaneous flow and interchange of reactant-gas-suspended solid bed particles from said reacting bed with solid bed particles of the same chemical composition from a separately maintained, cooler fluidized auxiliary bed in which the bed particles are suspended by an inert gas, effecting said interchange through a restricted communicating passage interposed between the upper portions of said beds which is inclined at an angle to the horizontal greater than the angle of repose of the bed particles being exchanged, during said interchange maintaining a higher static pressure by means of said inert gas in said auxiliary bed than that existing in said reacting bed and the level of the expanded reacting bed above the inlet to said communicating passage, overflowing into said passage suspended particles from said reacting bed and passing them by downward gravity flow along its bottom portion into said auxiliary bed, simultaneously flowing inert-gas-suspended particles from said auxiliary bed upwardly through the upper portion of said passage and into said reacting bed by maintaining a high, upward superficial inert gas velocity in said passage ranging from 5–10 times the gas velocity maintained in said auxiliary bed, and continuing said particle interchange between said auxiliary and reacting beds until the adjustment desired in said reaction bed becomes effected.

4. A process for adjusting and controlling the solids and heat contents of a continuously expanded reacting bed fluidized by means of a halogenating reaction gas, comprising periodically establishing and maintaining a two-directional simultaneous flow and interchange of suspended solid bed particles from said reacting bed with fluidized solid particles of the same chemical composition from a separately maintained auxiliary bed in which the particles are suspended in non-reacting state by means of an inert gas, effecting said interchange through a restricted passage interposed between the upper portions of said beds which passage is inclined at an angle to the horizontal greater than the angle of repose of the bed particles being exchanged, during said interchange maintaining a higher static pressure by means of said inert gas in said auxiliary bed than that prevailing in said reacting bed and the level of the expanded reacting bed above an inlet into said restricted passage, allowing suspended particles from said reacting bed to overflow into said passage for travel by gravity flow along its bottom portion into said auxiliary bed while simultaneously flowing inert-gas-suspended particles from said auxiliary bed upwardly through the upper portion of said passage and into said reacting bed by maintaining a high, upward superficial inert gas velocity in said passage ranging from 5–10 times the gas velocity maintained in said auxiliary bed, and continuing said particle interchange between said auxiliary and reacting beds until desired adjustment is made to said reacting bed.

5. A process for adjusting and controlling the $TiO_2$-containing solids and heat contents of a continuously expanded reaction bed maintained in fluidized state by means of a halogenating reacting gas, comprising periodically establishing and maintaining a two-directional simultaneous flow and interchange of $TiO_2$-containing solid particles from said reaction bed with $TiO_2$-containing solid bed particles from a separate, non-reacting auxiliary bed in which the particles are maintained in suspended state by means of a fluidizing inert gas, effecting said interchange of particles through a restricted communicating passage interposed between the upper portions of said beds and which is inclined at an angle to the horizontal greater than the angle of repose of the bed particles, during said interchange maintaining a higher static pressure by means of said inert gas in said auxiliary bed than that which is maintained in said reaction bed and the level of the expanded reaction bed above an inlet into said communicating passage, overflowing suspended particles from said reaction bed into said passage for downward gravity flow along its bottom portion into said auxiliary bed while simultaneously flowing inert-gas-suspended particles from said auxiliary bed upwardly through the upper portion of said passage and into said reacting bed by maintaining a high, upward superficial inert gas velocity in said passage ranging from 5–10 times the gas velocity maintained in said auxiliary bed, and continuing said interchange of solid particles between said auxiliary and reaction beds to accord with the adjustment desired in said reaction bed.

6. A process for adjusting and controlling the heat content of a continuously expanded reaction bed maintained at an elevated temperature, comprising periodically establishing and maintaining a simultaneous two-directional flow and interchange of reaction-gas-suspended solid bed particles from said reaction bed with inert-gas-suspended particles of the same chemical composition from an associated auxiliary bed maintained at a lower temperature than said reaction bed and wherein its bed particles are fluidized by means of an inert, non-corrosive gas, effecting said interchange of particles through a restricted inclined communicating passage maintained between the upper portions of said beds, during said interchange maintaining a higher static pressure by means of said inert gas in said auxiliary bed than that which is maintained in said reaction bed and the level of the expanded reaction bed above an inlet into said restricted passage, allowing suspended particles from said reaction bed to overflow into and pass downwardly by gravity along the bottom portion of said passage and into said auxiliary bed while simultaneously flowing inert-gas-suspended particles from said auxiliary bed upwardly through the upper portion of said passage and into said reaction bed by maintaining a high, upward superficial inert gas velocity in said passage ranging from 5–10 times the gas velocity maintained in said auxiliary bed, and continuing said interchange of solid bed particles between said auxiliary and reaction beds until the adjustment desired in said continuously expanded reaction bed is brought about.

7. A process for adjusting and controlling the temperature of a continuously expanded reaction bed maintained at an elevated temperature and in which the bed particles ar fluidized by means of a reactant gas, comprising periodically establishing and maintaining a two-directional flow and inteschange of particles from said reaction bed and suspended particles of the same chemical composition from a separate, auxiliary bed maintained in unheated state and in which the suspended particles are fluidized by means of an inert gas, effecting said particle interchange through a downwardly inclined restricted passage interposed between the upper portions of said beds, during said interchange maintaining a higher static pressure by means of said inert gas in said auxiliary bed than that maintained in said reacting bed and the level of the expanded reaction bed above an inlet into said restricted passage, allowing suspended particles in said reaction bed to overflow into said passage for downward flow by gravity in sliding relationship along its bottom portion and into said auxiliary bed while concurrently flowing inert-gas-suspended particles from said auxiliary bed upwardly through the upper portion of said passage and into said reaction bed by maintaining a high, upward superficial inert gas velocity in said passage ranging from 5–10 times the gas velocity maintained in said auxiliary bed, and discontinuing said particles flow and interchange upon completing the temperature adjustment desired in said reaction bed.

8. A process for controlling the solids and heat contents of a continuously expanded fluidized reaction bed employed in producing titanium tetrachloride by reacting a finely divided titaniferous ore in the presence of a carbonaceous reducing agent with gaseous chlorine as a reactant and fluidizing agent, comprising periodically establishing and maintaining a two-directional flow and interchange of fluidized solid bed particles from said reaction bed with unheated inert-gas-suspended titaniferous ore-containing particles from a separately maintained fluidized auxiliary bed which during said interchange is under a slightly higher static pressure by means of said inert gas than that prevailing in said reacting bed, effecting said interchange through the medium of an inclined restricted communicating passage interposed between the upper portions of said reaction and auxiliary beds, maintaining the level of said expanded reaction bed above the inlet into said inclined passage to flow hot particles from said reaction bed downwardly along the bottom portion of said passage and into said reaction bed while simulaneously passing inert-gas-suspended particles from said auxiliary bed upwardly through the top portion of said passage into said reaction bed countercurrent to the direction of flow of said hot particles by maintaining a high, upward superficial inert gas velocity in said passage ranging from 5–10 times the gas velocity maintained in said auxiliary bed, and discontinuing said particle exchange when the desired adjustment of solids and heat contents in said reaction bed is reached.

9. A process for controlling the solids and heat contents of a continuously expanded chlorine-gas-fluidized reaction bed employed in the production of titanium tetrachloride by chlorinating ilmenite at 600–1100° C. in the presence of a solid carbonaceous reducing agent, comprising periodically establishing and maintaining a two-directional flow and interchange of bed particles from said expanded reaction bed with cooler inert-gas-suspended ilmenite particles from a separate auxiliary fluidized bed which during said interchange is maintained by means of said inert gas at a higher static pressure than that existing in said reaction bed, effecting said interchange through an inclined communicating passage maintained between the upper portions of said beds, maintaining the level of the expanded reaction bed above the inlet to said passage, overflowing hot suspended particles from said reaction bed into said passage for downward gravity flow travel along its bottom portion and into said auxiliary bed while simultaneously flowing inert-gas-suspended cooler particles from said auxiliary bed upwardly through the upper portion of said passage into said reaction bed by maintaining a high, upward superficial inert gas velocity in said passage ranging from 5–10 times the gas velocity maintained in said auxiliary bed, carrying out said particle exchange while excluding reactant and product gases from said auxiliary bed and said communicating passage, and discontinuing said exchange on completion of the solids and heat contents adjustment desired.

10. A process for adjusting the solids and heat contents of an expanded chlorine-gas-fluidized reaction bed to desired values during its employment in the production of titanium tetrachloride by the fluidized bed chlorination of a titaniferous ore in the presence of a carbonaceous reducing agent at temperatures ranging from 600–1100° C., comprising periodically establishing and maintaining a dual interchange of reactant particles from said expanded reaction bed with similar but cooler particles from a separately maintained expanded auxiliary bed wherein particle fluidization is brought about by means of an inert gas, effecting said interchange through the medium of restricted downwardly inclined passage leading from the upper portion of said reaction bed to the upper portion of said auxiliary bed, maintaining the level of said expanded reaction bed above the inlet to said inclined passage and the static pressure in said auxiliary bed during said interchange slightly higher by means of said inert gas than in said reaction bed, flowing hot reaction bed particles downwardly by sliding gravity movement along the bottom portion of said passage into said auxiliary bed while concurrently charging inert-gas-suspended particles from said auxiliary bed upwardly through said passage and the top portion thereof countercurrent to the descending particles from said reaction bed by maintaining a high, upward superficial inert gas velocity in said passage ranging from 5–10 times the gas velocity maintained in said auxiliary bed, throughout said interchange preventing reaction bed reactant and product gases from entering into said auxiliary bed, and discontinuing said particle exchange when desired adjustment is made in said expanded reaction bed.

11. A process for adjusting the solids and heat contents of an expanded chlorine-gas-fluidized reaction bed to desired values during its employment in the production of titanium tetrachloride by the fluidized bed chlorination of finely divided ilmenite in the presence of a carbonaceous reducing agent at temperatures ranging from about 850–1000° C., comprising periodically establishing a dual interchange of hot reactant particles from said expanded reaction bed with similar but unheated ilmenite particles from a separately maintained expanded auxiliary bed in which particle fluidization is brought about by means of inert gaseous carbon dioxide, effecting said interchange through the medium of a restricted, downwardly inclined communicating conduit interposed between the top portions of said reaction and auxiliary beds, maintaining the level of said expanded reaction bed above an inlet into said conduit and the static pressure in said auxiliary bed during said interchange and by means of said inert gas slightly above that prevailing in said reaction bed, overflowing particles from the latter bed into said inlet and conduit for downward, sliding gravity flow passage along the bottom of said conduit into said auxiliary bed while simultaneously flowing inert-gas-suspended particles from said auxiliary bed upwardly through the top portion of said conduit counter to those being removed from said reaction bed by maintaining a high, upward superficial inert gas velocity in said passage ranging from 5–10 times the gas velocity maintained in said auxiliary bed, throughout said interchange preventing reaction bed reactant and product gases from entering into said auxiliary bed, and upon completing the reaction bed adjustment being effected discontinuing further particle exchange between said beds.

References Cited in the file of this patent

UNITED STATES PATENTS

| | | |
|---|---|---|
| 2,463,434 | Shankland | Mar. 1, 1949 |
| 2,465,462 | Layng | Mar. 29, 1949 |
| 2,684,890 | Lapple et al. | July 27, 1954 |
| 2,692,192 | Martin | Oct. 19, 1954 |
| 2,701,179 | McKinney | Feb. 1, 1955 |